(12) United States Patent
Ogasawara

(10) Patent No.: US 8,350,510 B2
(45) Date of Patent: Jan. 8, 2013

(54) VOLTAGE BOOSTER APPARATUS FOR POWER STEERING SYSTEM

(75) Inventor: Terumoto Ogasawara, Chiryu (JP)

(73) Assignee: Denso Corporation, Kariya (JP)

( * ) Notice: Subject to any disclaimer, the term of this patent is extended or adjusted under 35 U.S.C. 154(b) by 288 days.

(21) Appl. No.: 12/954,199

(22) Filed: Nov. 24, 2010

(65) Prior Publication Data

US 2011/0127936 A1 Jun. 2, 2011

(30) Foreign Application Priority Data

Nov. 27, 2009 (JP) ................. 2009-270374

(51) Int. Cl.
*H02P 27/00* (2006.01)

(52) U.S. Cl. ........... 318/400.3; 318/400.21; 318/400.22; 180/443; 323/234; 323/318

(58) Field of Classification Search ............ 318/400.21, 318/400.22, 400.3; 180/65.275, 443; 701/43; 323/234, 318

See application file for complete search history.

(56) References Cited

U.S. PATENT DOCUMENTS

| 6,664,517 B2* | 12/2003 | Nagatomo | 219/494 |
|---|---|---|---|
| 6,885,225 B2* | 4/2005 | Ohmichi et al. | 327/112 |
| 7,106,012 B2* | 9/2006 | Matsuda et al. | 318/139 |
| 7,129,663 B2* | 10/2006 | Suzuki | 318/504 |
| 7,257,475 B2* | 8/2007 | Asaumi et al. | 701/43 |
| 7,583,069 B2* | 9/2009 | Suzuki | 323/285 |
| 7,586,311 B2* | 9/2009 | Nozaki et al. | 324/522 |
| 7,602,140 B2* | 10/2009 | Asaumi et al. | 320/104 |
| 8,018,191 B2* | 9/2011 | Nagase | 318/479 |
| 8,159,166 B2* | 4/2012 | Koike | 318/400.21 |
| 8,240,425 B2* | 8/2012 | Nagase | 180/443 |
| 2003/0006228 A1* | 1/2003 | Nagatomo | 219/494 |
| 2003/0071587 A1* | 4/2003 | Suzuki et al. | 318/139 |
| 2005/0038585 A1* | 2/2005 | Asaumi et al. | 701/43 |
| 2005/0099160 A1* | 5/2005 | Asaumi et al. | 320/132 |
| 2005/0200202 A1* | 9/2005 | Mihara | 307/10.1 |
| 2005/0258792 A1* | 11/2005 | Matsuda et al. | 318/432 |
| 2006/0044852 A1* | 3/2006 | Suzuki | 363/59 |
| 2006/0055351 A1* | 3/2006 | Suzuki | 318/432 |
| 2008/0265808 A1* | 10/2008 | Sparey et al. | 318/139 |
| 2009/0040068 A1* | 2/2009 | Oyobe et al. | 340/932.2 |
| 2009/0078493 A1* | 3/2009 | Nagase | 180/443 |
| 2009/0134853 A1* | 5/2009 | Suzuki et al. | 323/234 |
| 2010/0109588 A1* | 5/2010 | Koike | 318/400.21 |
| 2010/0246086 A1* | 9/2010 | Ishiguro et al. | 361/160 |
| 2010/0263960 A1* | 10/2010 | Nagase | 180/443 |
| 2011/0015828 A1* | 1/2011 | Shimizu | 701/43 |
| 2011/0272205 A1* | 11/2011 | Fujimoto et al. | 180/446 |

FOREIGN PATENT DOCUMENTS

| JP | 2003-319699 | 11/2003 |
|---|---|---|
| JP | 3885621 | 12/2006 |
| JP | 2009-040149 | 2/2009 |

* cited by examiner

*Primary Examiner* — Paul Ip

(74) *Attorney, Agent, or Firm* — Nixon & Vanderhye PC

(57) ABSTRACT

In a voltage booster apparatus, a charge control transistor is turned on to charge a coil output capacitor and a booster output capacitor and then turned off, thereby confirming rise of a coil output voltage and a booster output voltage. A power supply relay is turned on to restore a booster operation thereby to check rise of the booster output voltage. If both of a step-up FET and a step-down FET are not in short-circuit failure, ON state of the power supply relay is fixed thereby to restore a power steering system operation.

11 Claims, 5 Drawing Sheets

VOLTAGE BOOSTER APPARATUS FOR POWER STEERING SYSTEM

CROSS REFERENCE TO RELATED APPLICATION

This application is based on and incorporates herein by reference Japanese Patent Application No. 2009-270374 filed on Nov. 27, 2009.

FIELD OF THE INVENTION

The present invention relates to a voltage booster apparatus for a power steering system, which power assists steering of a steering wheel.

BACKGROUND OF THE INVENTION

As disclosed in the following patent documents 1, 2 and 3, electric power steering systems are provided conventionally as steering systems in vehicles.

Patent document 1: JP 2003-267247A (JP 3885621)
Patent document 2: JP 2003-319699A
Patent document 3: JP 2009-40149A According to such conventional electric power steering systems, a voltage booster circuit is provided to boost (step up) a voltage of a battery and supply a motor drive apparatus with a boosted voltage. In the patent documents 2 and 3, the booster circuit is configured with a coil, switching elements, a backflow prevention element, a capacitor and a booster control circuit. The booster circuit in the patent document 1 is configured also in the similar manner.

The switching elements are specifically transistors such as n-channel MOS field effect transistors, each of which is referred to as FET.

In the booster circuit, induction energy is stored in the coil when the switching element is turned on, and the capacitor is charged with by a current when the switching element is turned off. The current flows in a direction, which is permitted by the backflow prevention element. The voltage is boosted by repetition of turning on and off of the switching element.

The booster control circuit controls the ON-duty ratio Don(%) of the switching element by feeding back the boosted voltage so that the boosted voltage attains a target voltage level. The ON-duty ratio Don is defined by the following equation.

$$Don = \text{ON-period}/(\text{ON-period}+\text{OFF-period})$$

A voltage step-down switch is connected in parallel to a diode, which is the backflow prevention element, for the following reason. When the switching element is in the OFF state, the voltage step-down switch is turned on so that the capacitor is charged by the current supplied from the coil. This current flows through the step-down switch of a small resistance without flowing through a diode of a large resistance. Thus, heat generation by the diode is reduced and as a result heat generation by the entire booster circuit is suppressed.

In some cases, the switching elements provided in the voltage booster circuit are subjected to a short-circuit failure. The switching elements are referred to as a step-up FET and a step-down FET The short-circuit failure of the step-up FET and the step-down FET is a short-circuit between a drain and a source in its OFF state. If the step-up FET is short-circuited, a large current flows from the coil in the OFF state and causes the step-up FET to generate heat. If the step-down FET is short-circuited, the voltage produced by the step-down FET is not boosted to a target level. Therefore, the ON-duty ratio is repetitively increased by the feedback control to promote the voltage boosting operation. As a result, the step-up FET is driven with almost the 100% ON-duty ratio, that is, driven to the full ON state.

It is proposed to detect possibility of short-circuit of a subject element during a system operation by persistently monitoring voltages developed at predetermined circuit points to which such a subject element is connected. For example, a voltage at a predetermined circuit point falls when a certain point in a circuit is turned on contrary to an original circuit design. If such a voltage fall is detected at the certain point, it is possible to determine that a subject element is likely to have the short-circuit failure. If the short-circuit failure is determined, a power supply relay is turned off to instantaneously shut off supply of the battery voltage to the booster circuit.

This fail-safe operation need be performed within a very short time, for example, in an order of 1/100 seconds. As the fail-safe operation time is set shorter, detection error may arise more often. For example, even when a voltage at a monitored point just accidentally falls in spite of no actual short-circuit failure of the subject element, the subject element is determined to be in failure erroneously and a power supply relay is turned off.

This determination error sometimes arises, when a power supply terminal for the booster circuit only momentarily cannot keep contact due to vibration or the like. Such a momentary disconnection is not influential to the operation of the booster circuit. It is not desirable to interrupt the power supply to the booster circuit too frequently by such a momentary disconnection.

SUMMARY OF THE INVENTION

It is therefore an object of the present invention to provide a voltage booster apparatus for a power steering system, which safely returns the system to a regular operation by confirming no short-circuit failure of a subject element even when a power supply relay is turned off erroneously.

According to the present invention, a voltage booster apparatus for a power steering system has a battery, a booster circuit, a charge switching element and a control unit. The booster circuit includes a coil, a step-up switching element, an output capacitor and a current flow control element. The coil has an input end for receiving the battery voltage. The step-up switching element is connected in series with the coil at an output end of the coil. The output capacitor is connected in series with the coil in parallel relation with the step-up switching element. The current flow control element is connected between the output end of the coil and one end of the capacitor for preventing a current flow from the capacitor to the coil. The charge switching element is connected to the output end of the coil for supplying a reference voltage to the output end of the coil when turned on. The control unit is configured to control a voltage boosting operation of the booster circuit by turning on and off the step-up switching element so that the coil produces a coil output voltage at the coil output end a boosted voltage is produced from the output capacitor. The control unit is configured to interrupt supply of the battery voltage to the booster circuit upon detection of a short-circuit failure of the step-up switching element or the current flow control element. The control unit is configured to turn on the charge switching element to supply the reference voltage to the output end of the coil for charging the output capacitor by the reference voltage in response to interruption of the battery voltage. The control unit being configured to turn on the step-up switching element in a predetermined manner after the output capacitor is charged with the reference voltage. The control unit is configured to check whether the step-up switching element and the current flow control element have the short-circuit failure based on the coil output voltage and the boosted voltage produced after the charge switching element is turned on to supply the reference voltage. The control unit is configured to restore the supply of the battery voltage to the booster circuit after both of the step-up switching element and the current flow control element are determined to have no short-circuit failure.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in details with reference to a plurality of embodiments of a voltage booster apparatus provided for a power steering system of a vehicle.

(First Embodiment)

Figure 1:
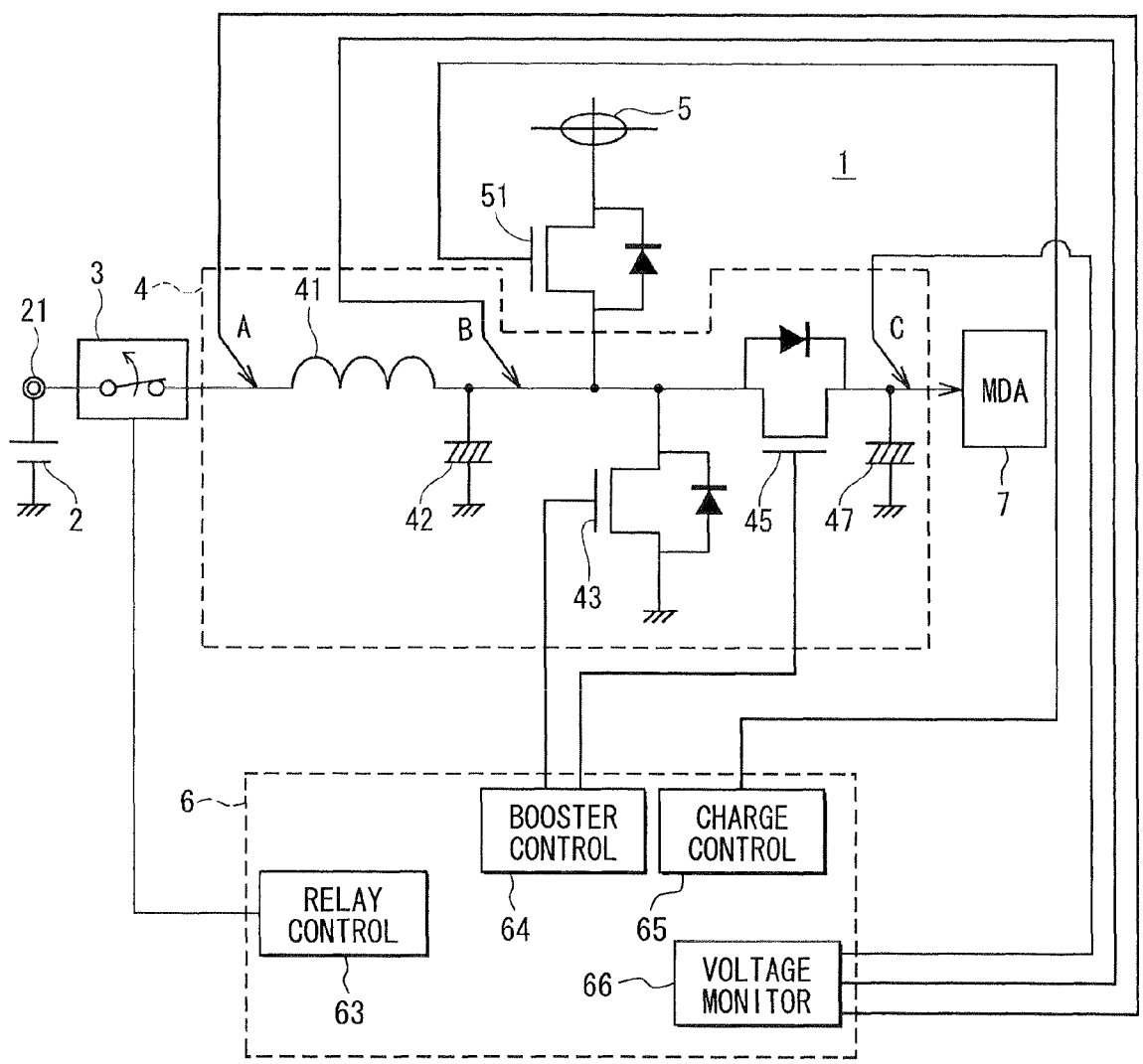
FIG. 1 is a circuit diagram showing a voltage booster apparatus according a first embodiment of the present invention.

Referring to FIG. 1, a power steering system is configured to generate a torque by an electric motor for power-assisting a steering operation of a steering wheel based on a steering torque signal and a vehicle travel speed signal. The motor is, for example, a three-phase brushless motor (not shown). A voltage booster apparatus 1 is provided to control the motor by a motor drive apparatus (MDA) 7.

The voltage booster apparatus 1 includes a voltage booster circuit 4, which is configured to boost a battery voltage VI supplied by a battery 2 and supply the motor drive apparatus 7 with a boosted voltage Vc as a booster output voltage. The voltage booster circuit 4 includes a coil 41, two capacitors 42, 47 and two switching elements, which are a step-up FET 43 and a step-down FET 45.

The battery 2 is mounted on the vehicle and its negative terminal is ground. A power supply terminal 21 of the battery 2 is provided between the battery 2 and a power supply relay 3 for supplying the battery voltage VI, for example, 12V. The power supply terminal 21 is an electric connector, in which a plug is fitted in a receptacle to provide an electric connection by mechanical contact therebetween. The mechanical contact is maintained normally by resilient force but is subjected to momentary disconnection (non-contact) due to vibration or the like.

The power supply relay 3 is a normally-closed type and connected between the power supply terminal 21 and the coil 41 of the voltage booster circuit 4. The power supply relay 3 supplies the battery voltage VI in its ON state and interrupts supply of the battery voltage VI to the voltage booster circuit 4 when turned off by a microcomputer 6, which is provided as a control unit for the booster circuit 4.

The coil 41 is connected to the power supply terminal 21 through the power supply relay 3 to store electric energy therein and generate an induction voltage when the stored energy is discharged. The coil 41 has a predetermined input-side circuit point A and a predetermined output-side circuit point B. Voltages developed at the circuit points A and B are referred to as coil input voltage VA and a coil output voltage VB, respectively. The capacitor 42 is connected as a coil output capacitor to the coil 41 at the circuit point B and to the ground to filter out radio noises.

The step-up FET 43 is connected to the circuit point B at its drain and to the ground at its source. The step-up FET 43 has its parasitic diode, a cathode and an anode of which are connected to the drain and the source of the step-up FET 43, respectively. Thus, this parasitic diode prevents a current from flowing from the circuit point B to the ground therethrough. The step-up FET 43 has a gate connected to a booster circuit control section 64 to be turned on and off under control by the booster circuit control section 64.

The step-down FET 45 has a drain and a source, which are connected to the circuit point B and the capacitor 47, respectively. The source of the step-down FET 45 and the capacitor 47 are connected at a predetermined circuit point C. The boosted voltage developed at the circuit point C is referred to as VC. The capacitor 47 is provided as a booster output capacitor for outputting the boosted voltage VC to the motor drive apparatus 7. The step-down FET 45 has its parasitic diode, an anode and a cathode of which are connected to the drain and the source of the step-down FET 45, respectively. Thus, this parasitic diode prevents a current from flowing from the circuit point C (capacitor 47) to the circuit point B (coil 41) therethrough and operates as a current flow control element. The step-down FET 45 has a gate connected to the booster circuit control section 64 to be turned on and off under control of the booster circuit control section 64. Discrete diodes may be used as the parasitic diodes of the FETs 43 and 45. The output capacitor 47 is also connected to the ground at its negative terminal.

A charge power supply terminal 5 is provided to supply a reference voltage VJ to the booster circuit 4. The power supply terminal 5 may be connected to an ignition terminal of the vehicle.

A transistor 51, which is also a FET provided as a charge switch, is provided with its source and drain connected to the circuit point B and the power supply terminal 5, respectively. The transistor 51 has its parasitic diode, an anode and a cathode of which are connected to the source and the drain of the transistor 51, respectively. Thus, this parasitic diode prevents a current from flowing from the power supply terminal 5 to the circuit point B. The transistor 51 has a gate connected to a charge circuit control section 65 to be turned on and off under control of the charge circuit control section 65. The transistor 51 may be replaced with any other switching element.

The circuit points A, B and C are connected to a voltage monitor section 66, which monitors the voltages VA (coil input voltage), VB (coil output voltage) and VC (boosted voltage). The microcomputer 6 provided as the control unit for the booster circuit 4 is programmed to perform the functions of the power supply relay control section 63, booster circuit control section 64, charge circuit control section 65 and voltage monitor section 66.

The voltage booster apparatus 1 operates as follows.

Under the normal operation (no failure), the transistor 51 is not turned on and is maintained in the OFF state. The voltage boosting operation is performed by the coil 41, the step-up FET 43, the step-down FET 45, the output capacitor 47, the booster circuit control section 64 and the voltage monitor section 66. The control section 64 applies switching signals to the step-up FET 43 and the step-down FET 45, respectively. These switching signals are PWM signals, which indicate the ON duty ratios Don. The PWM signal applied to the step-up FET 43 and the PWM signal applied to the step-down FET 45 are opposite to each other in phase. Thus, when the step-up FET 43 is turned on and off, the step-down FET 45 is turned off and on, respectively.

When the step-up FET 43 and the step-down FET 45 are turned on and off, respectively, a current flows from the battery 2 to the coil 41. The coil 41 thus stores electric energy therein. When the step-up FET 43 and the step-down FET 45 are turned off and on, respectively, the coil 41 generates an induction voltage. This induction voltage is superimposed onto the battery voltage VI. The coil 41 thus discharges the stored energy and charges the output capacitor 47.

By the repetition of the foregoing operation, the boosted voltage VC is raised. The booster circuit control section 64 calculates the ON duty ratio Don based on the coil input voltage VA and the boosted voltage VC monitored by the voltage monitor section 66 so that the boosted voltage VC attains the target voltage level. It is assumed that the coil input voltage VA is equal to the battery voltage VI, which is about 12V, and the target voltage level of the boosted voltage VC is about 36V. If the boosted voltage VC is monitored as being close to 36V, the ON duty ratio Don is reduced to suppress the voltage boosting operation. If the boosted voltage VC is monitored as being lower than 36V, the ON duty ratio Don is increased to promote the voltage boosting operation.

Figure 2:
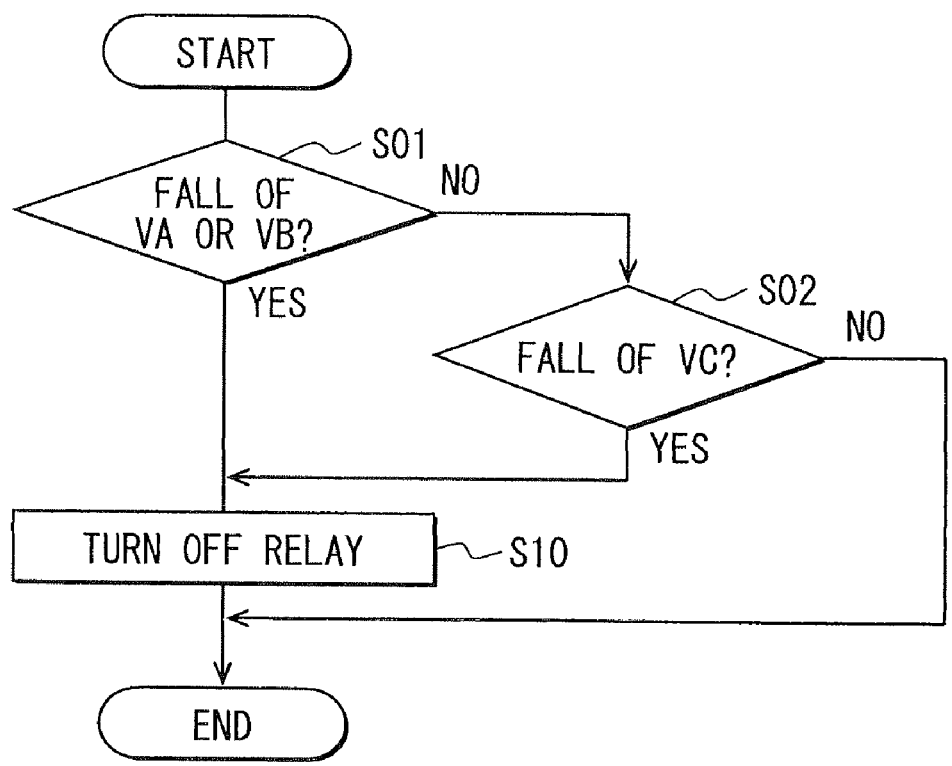
FIG. 2 is a flowchart showing monitor processing executed in the first embodiment.

The microcomputer 6 is performs the voltage monitor operation as shown in FIG. 2. The voltage monitor section 66 monitors the coil input voltage VA, the coil output voltage VB and the boosted voltage VC during the operation of the power steering system so that the short-circuit failure of the step-up FET 43 or the step-down FET 45 may be detected.

If the source and the drain of the step-up FET 43 are short-circuited, the coil output voltage VB induced by the coil 41 is grounded through the step-up FET 43 even if the diode is reverse-biased. As a result, a large current flows in the step-up FET 43. Both the coil input voltage VA and the coil output voltage VB fall.

If the source and the drain of the step-down FET 45 are short-circuited, the circuit points B and C are connected to each other and the boosted voltage VC is hardly increased. If the boosted voltage VC is lower than the target voltage level, the booster circuit control section 64 repeats to increase the ON duty ratio Don of the step-up FET 43. If the ON duty ratio Don is increased to as high as almost 100%, that is, the step-up FET 43 is driven to the full ON state, a large current flows in the similar manner as in the case of the short-circuit failure of the step-up FET 43. Thus, if the step-down FET 45 has the short-circuit failure, the boosted voltage VC is lowered.

In any event of short-circuit failure in the step-up FET 43 or the step-down FET 45, a large current flows in the step-up FET 43.

To prevent such a large current flow, it is checked at S01 (FIG. 2) whether the coil input voltage VA or the coil output voltage VB has fallen. If the check result is YES, which indicates that the step-up FET 43 has possibly the short-circuit failure, S10 is executed. If the check result is NO, it is further checked at S02 whether the boosted voltage VC has fallen. If the check result at S02 is YES, which indicates that the step-down FET 45 has possibly the short-circuit failure, S10 is executed. S02 may be executed before S01 or at the same time as S01.

At S10, the power supply relay control section 63 turns off the power supply relay 3 to shut off power supply from the battery 2, because it is likely that at least one of the step-up FET 43 and the step-down FET 45 has a short-circuit failure. If the check results at S01 and S02 are NO, which indicate that both the step-up FET 43 and the step-down FET 45 are operating normally, the power supply relay 3 is not turned off from the ON state.

The coil input voltage VA, the coil output voltage VB and the boosted voltage VC may possibly fall due to some causes other than the short-circuit failure of the step-up FET 43 or the step-down FET 45. For example, if some electrical or mechanical disconnection occurs accidentally in the power supply terminal 21, the power supply from the battery 2 may be interrupted causing fall of the voltages VA, VB or VC. In case of such an accidental power supply interruption, which is generally only temporary, the power supply relay 3 need not be turned off.

It is desired to perform the voltage monitor processing of FIG. 2 in a short time, for example, in an order of $1/100$ seconds, so that the short-circuit failure may be detected at the earliest time and a power supply is interrupted immediately. However, if the monitor processing of FIG. 2 is executed in such a short time, the temporary accidental power supply interruption is likely to be determined as a failure erroneously. It is of course not desired that the power supply from the battery 2 is interrupted disabling the power steering system operation due to such an erroneous determination.

Therefore, the booster apparatus 1, particularly the control unit 6, checks whether any one of the step-up FET 43 or the step-down FET 45 actually has the short-circuit failure when the power supply relay 3 is turned off as a result of the monitor processing. If the check result indicates no short-circuit failure, the power supply relay 3 is turned on again to restore the normal operation of the power steering system in the following manner shown in FIG. 3.

Figure 3:
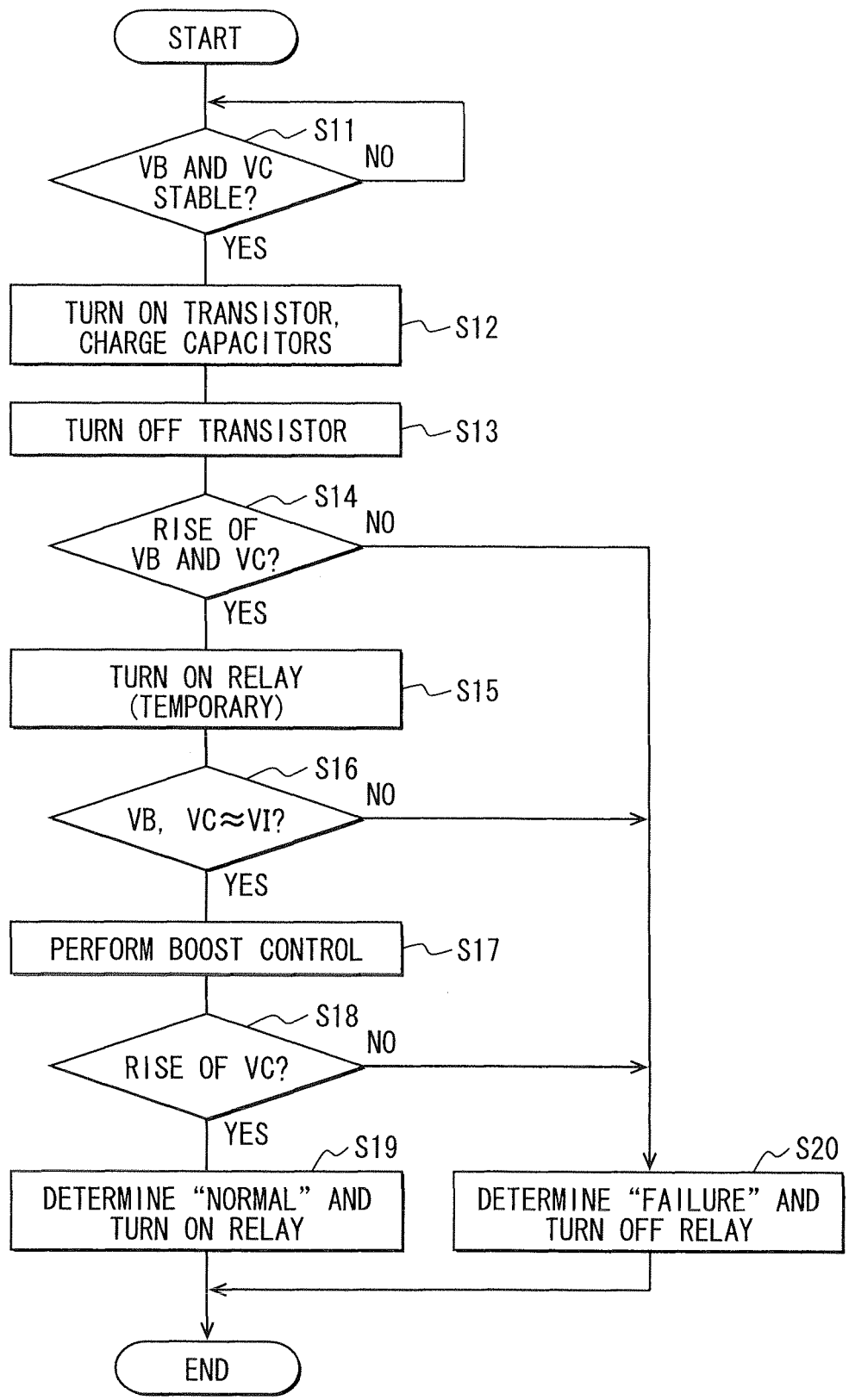
FIG. 3 is a flowchart showing operation restoration processing executed in the first embodiment.

The operation restoration processing shown in FIG. 3 is performed automatically after the power supply relay 3 has been turned off at S10 in the monitor processing shown in FIG. 2. In the operation restoration processing, it is first checked at S10 whether the coil output voltage VB and the boosted voltage VC are stabilized by monitoring such voltages VB and VC by the voltage monitor section 66. If the check result at S11 is YES indicating that the voltages are stabilized, for example, the amount of change of each voltage in a predetermined time period is less than a predetermined amount, S12 is executed. If the check result is NO, for example, the amount of change is greater than the predetermined amount, S11 is repeated until the both voltages VB and VC are stabilized. S11 is executed because it is desired that S12 is executed under a condition that the coil output voltage VB and the boosted voltage VC are stable. It is also possible to start S12 after a predetermined time period, in which the voltages VB and VC are stabilized without fail, from turn-off of the power supply relay 3 (S10). This may however result in spending more time before starting S12. By confirming that the amounts of time change of the coil output voltage VB and the boosted voltage VC are less than the predetermined amount, S12 can be started in the shortest time after S10.

At S12, after the coil output voltage VB and the boosted voltage VC are stabilized, the transistor 51 is turned on by the charge circuit control section 56. A current flows from the charge power supply terminal 5 to the circuit point B through the transistor 51. Thus, the reference voltage VJ is supplied to the circuit point B with only a negligible voltage drop at the transistor 51. Thus the capacitor 42 is charged. The current flows from the circuit point B to the circuit point C through the parasitic diode of the step-down FET 45 to charge the output capacitor 47.

Then, at S13, the transistor 51 is turned off by the charge circuit control section 65. The supply of current from the charge power supply terminal 5 is interrupted. If the step-up FET 43 is normal and not short-circuited, the coil output voltage VB at the circuit point B is maintained. If the step-up FET 43 is abnormal, that is, short-circuited, a current flows from the circuit point B to the ground and the coil output voltage VB falls.

It is checked at S14 whether the coil output voltage VB and the voltage VC rise. If the check result at S14 is YES, it is determined that the step-up FET 43 is normal and not short-circuited. In this case, S15 is executed. If the check result at S14 is NO, it is determined that the step-up FET 43 is short-circuited and in failure. In this case, the OFF state of the power supply relay 3 is maintained to thereby stop the operation of the power steering system. It is also possible to check at S14 whether the coil output voltage VB and the boosted voltage VC rise to be close to the reference voltage VJ.

At S15, the power supply relay 3 is turned on again by the power supply relay control section 63. That is, the power supply relay 3 is temporarily turned on, that is, temporarily returned to the normally ON state, assuming that at least the step-up FET 43 has no short-circuit failure. If the booster power supply terminal 21 is normal, that is, not subjected to disconnection, a current flows from the battery 21 to the circuit point B through the power supply relay 3 and the coil 4 so that the battery voltage VI is applied to the circuit point B with only a negligible voltage drop. If the battery voltage VI is greater than the reference voltage VJ, the coil output voltage VB will rise from about the reference voltage VJ to about the battery voltage VI. The current also flows from the circuit point B to the circuit point C through the step-down FET 45, and the boosted voltage VC will rise to about the battery voltage VI. If the booster power supply terminal 21 is fully disconnected and not just a temporary accidental disconnection, no current flows to the circuit point B and hence the coil output voltage VB does not rise. The boosted voltage VC does not rise either.

It is checked at S16 whether the coil output voltage VB and the boosted voltage VC rose to be close to the battery voltage VI, by comparing the coil output voltage VB and the boosted voltage VC with a reference voltage, which is set to be close to the battery voltage VI. If the check result is YES, it is determined that the booster power supply terminal 21 is normal. In this case, S17 is executed. If the check result is NO, it is determined that the booster power supply terminal 21 has disconnection. In this case, the power supply relay 3 is returned to the OFF state and the system operation is stopped.

At S17, the voltage boosting operation control is started by the booster circuit control section 64 assuming that at least the step-up FET 43 and the booster power supply terminal 21 are normal. The step-up FET 43 and the step-down FET 45 are turned on and off alternately in opposite phases thereby to generate the boosted voltage VC. If the step-down FET 45 is normal, the boosted voltage VC rises to be about the coil output voltage VB. If the step-down FET 45 has the short-circuit failure, a current flows in reverse from the circuit point C to the circuit point B and the boosted voltage VC does not rise to be higher than the coil output voltage VB at the time the booster circuit control section 64 controls the step-down FET 45 to tuned off.

It is therefore checked at S18 whether the boosted voltage VC rose to the target level higher than the coil output voltage VB. If the check result at S18 is YES, it is determined at S19 that the step-down FET 45 is normal and has no short-circuit failure. If the check result at S18 is NO, it is determined at S20 that the step-down FET 45 has the short-circuit failure and the power steering system operation is stopped.

At S19, the power supply relay 3 is turned on or maintained in its ON state by the power supply relay control section 63 based on the determinations that both of the FETs 43 and 45 have no short-circuit failure and the booster power supply terminal 21 has no disconnection. By S19 or S20, the restoration operation is terminated.

As described above, the power steering system operation can be restored safely by confirming that both the step-up FET 43 and the step-down FET 45 are actually normal, even when a certain failure such as an accidental temporary disconnection of the booster power supply terminal 21 is detected erroneously.

(Second Embodiment)

Figure 4:
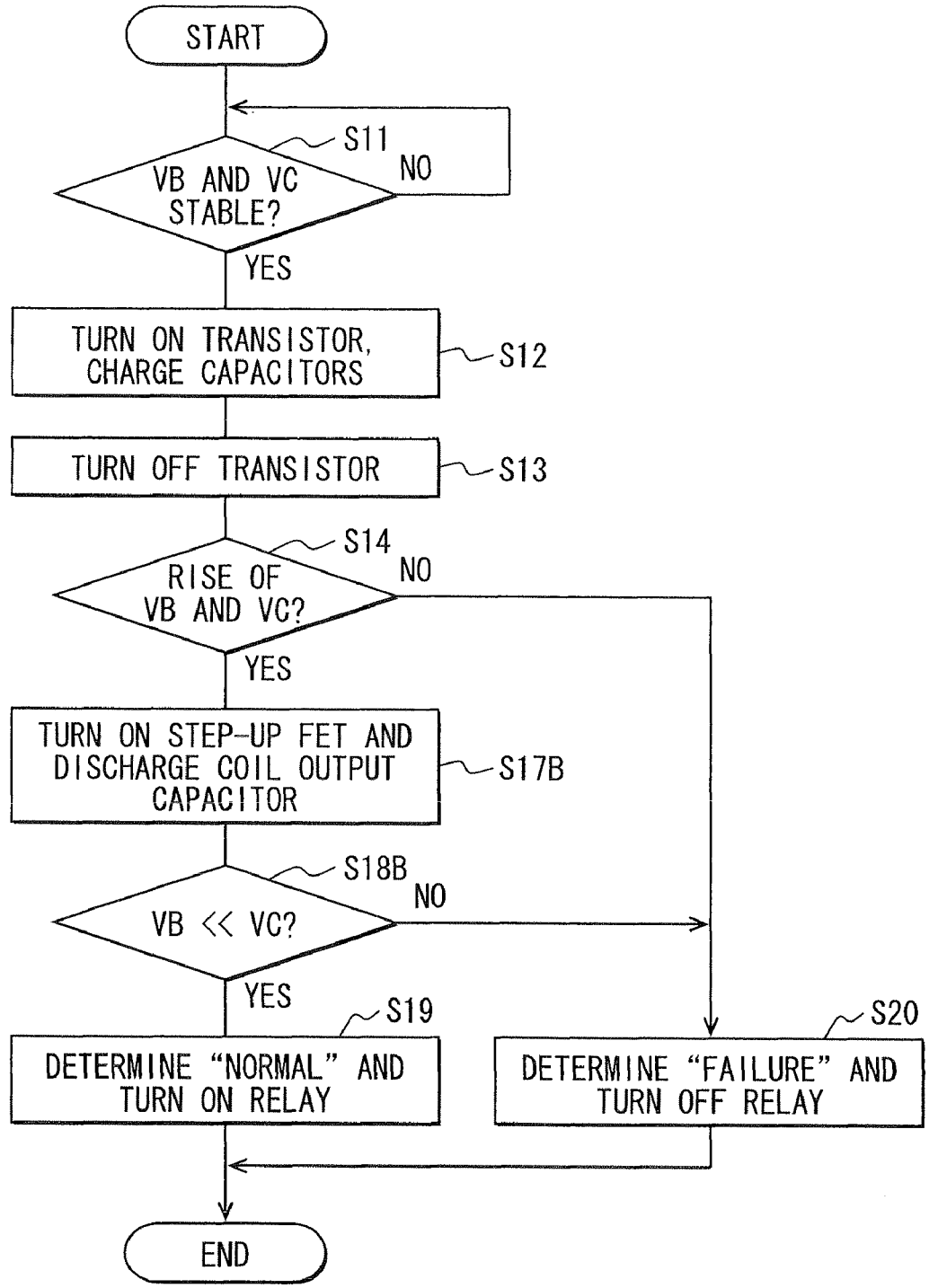
FIG. 4 is a flowchart showing operation restoration processing executed in a second embodiment of the present invention.

According to a second embodiment, the operation restoration processing of the first embodiment shown in FIG. 3 is modified as shown in FIG. 4.

Specifically, S11 to S14 are executed in the same manner as in the first embodiment. At S17B, however, the step-up FET 43 is turned on by the booster circuit control section 64 with the power supply relay 3 being maintained in the OFF state. The charge stored in the coil output capacitor 42 is discharged to the ground from the circuit point B through the step-up FET 43. As a result, the coil output voltage VB falls. If the step-down FET 45 is normal and not short-circuited, the boosted voltage VC at the circuit point C is maintained. If the step-down FET 45 is short-circuited, on the other hand, a current flows in reverse from the circuit point C to the circuit point B. As a result, the boosted voltage VC falls to be about the coil output voltage VB.

It is checked at S18B whether the boosted voltage VC is far higher than the coil output voltage VB, that is, VB<<VC. If the check result at S18B is YES, it is determined at S19 that the step-down FET 45 is normal. In this case, S19 is executed. If the check result at S18B is NO, it is determined at S20 that the step-down FET 45 is in the short-circuit failure. The power supply relay 3 is turned off (maintained in the OFF state) and the power steering system operation is stopped at S20.

At S19, the power supply relay 3 is turned on again by the power supply relay control section 63, because it is confirmed at S14 and S18B that both the step-up FET 43 and the step-down FET 45 have no short-circuit failure. Thus, the power steering operation is restored. Thus, without executing the temporary turn-on of the power supply relay 3 (S15 in FIG. 3), the power steering operation is restored safely after confirming no short-circuit failure in any of the step-up FET 43 and the step-down FET 45.

(Third Embodiment)

Figure 5:
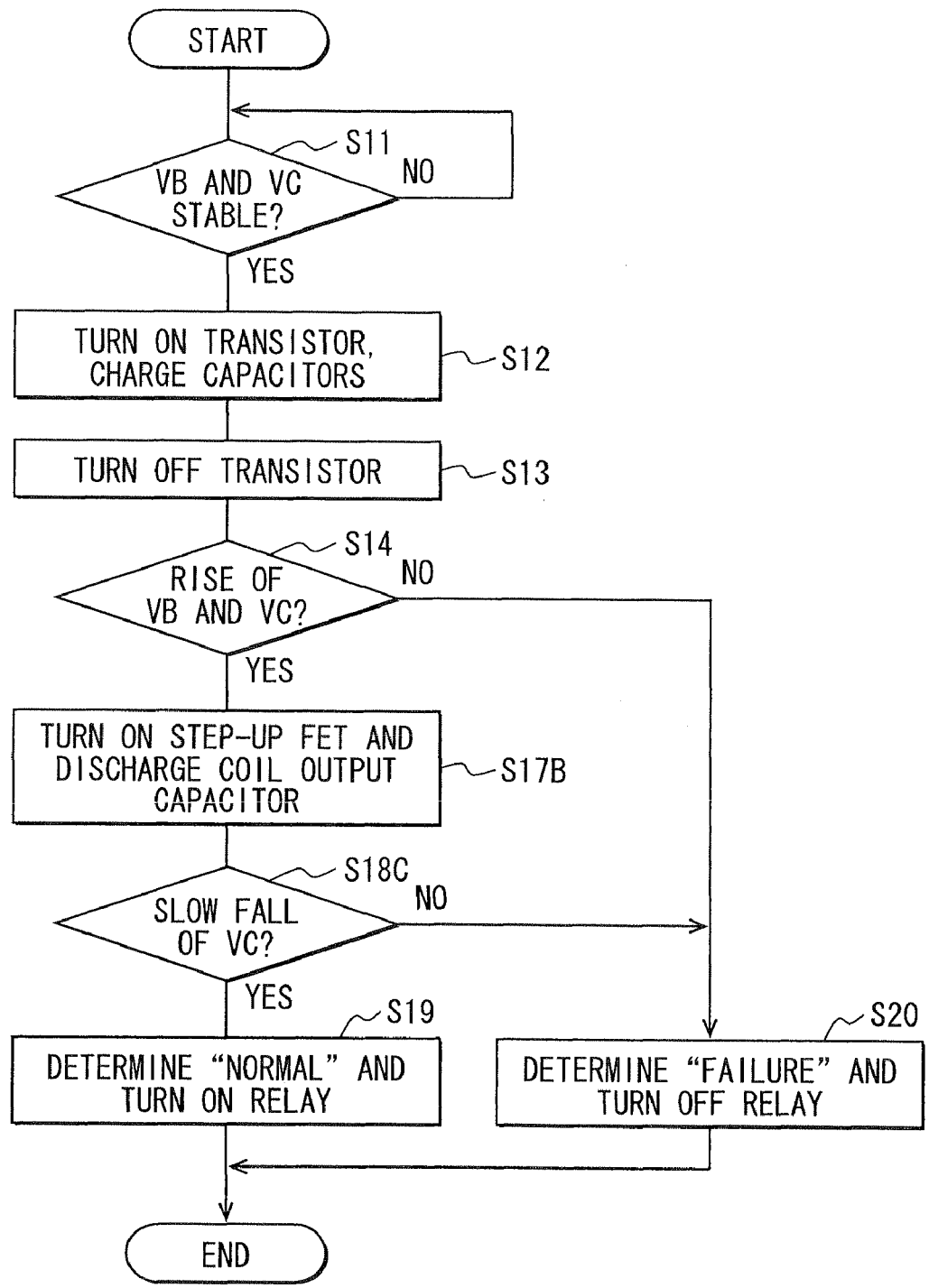
FIG. 5 is a flowchart showing operation restoration processing executed in a third embodiment of the present invention.

According to a third embodiment, the operation restoration processing of the second embodiment shown in FIG. 4 is modified as shown in FIG. 5. Specifically, S18B in the second embodiment is replaced with S18C in the third embodiment.

As described in the second embodiment, if the step-down FET 45 has the short-circuit failure, the boosted voltage VC falls to as low as the coil output voltage VB due to the current flow in reverse from the circuit point C to the circuit point B. It is checked at S18C whether the boosted voltage VC falls rapidly or slowly based on the monitored voltage acquired by the voltage monitor section 66. If the check result at S18C is YES, that is, a fall speed is less than a predetermined speed, S19 is executed. If the check result at S18 is NO, that is, a fall speed is greater than the predetermined speed, it is determined that the step-down FET 45 is short-circuited. In this case, at S20, the power supply relay 3 is maintained in the OFF state so that the power steering operation is stopped.

At S19, it is determined that the step-down FET 45 is normal and not short-circuited and the power supply relay 3 is turned on again by the power supply relay control section 63 to restore the power steering operation. Thus, also in the third embodiment, the power steering operation is restored safely after confirming no short-circuit failure in any of the step-up FET 43 and the step-down FET 45.

The present invention is not limited to the disclosed embodiments but may be implemented in different embodiments.

What is claimed is:

1. A voltage booster apparatus for a power steering system comprising:
    a booster power supply terminal for supplying a battery voltage;
    a power supply relay;
    a booster circuit including a coil, a step-up switching element, a backflow prevention element and an output capacitor, the coil having an input end connected in series with the booster power supply terminal through the power supply relay, the step-up switching element having one end connected to an output end of the coil and an other end connected to a ground, the backflow prevention element having one end connected to the output end of the coil in parallel with the step-up switching element to prevent backflow of a current from an other end thereof to the one end thereof, and the output capacitor having one end connected to the other end of the backflow prevention element and an other end connected to the ground;
    a booster circuit control section connected to a control terminal of the step-up switching element to perform voltage boosting control by turning on and off the step-up switching element;
    a power supply relay control section configured to supply or interrupt the battery voltage to the input end of the coil by turning on and off the power supply relay;
    a voltage monitor section configured to check whether a short-circuit failure is present in the step-up switching element or the backflow prevention element by monitoring at least one of a coil input voltage developed at the input end of the coil, a coil output voltage developed at the coil output end and a boosted voltage developed at the one end of the output capacitor;
    the voltage monitor section being configured to control, upon detection of the short-circuit failure, the power supply relay control section to turn off the power supply relay thereby stopping a power steering operation;
    a charge power supply terminal provided to supply a reference voltage to the booster circuit;
    a charge switching element connected between the output end of the coil and the charge power supply terminal; and
    a charge circuit control section connected to a control terminal of the charge switching element for supplying or interrupting the reference voltage to the output end of the coil by turning on and off the charge switching element,
    wherein the charge circuit control section is configured to supply the reference voltage to the booster circuit by turning on the charge switching element after the power supply relay is turned off by the power supply relay control section, and the booster circuit control section or the relay control section is configured to perform a predetermined operation, so that the voltage monitor section checks whether the short-circuit failure is present, and
    wherein the power supply relay control section is configured to turn on the power supply relay again thereby restoring the power steering operation, when no short-circuit failure is determined.

2. The voltage booster apparatus according to claim 1, wherein:
    the charge switching element is connected to supply, when turned on, the reference voltage to the booster circuit for charging the output capacitor by the reference voltage;
    the charge circuit control section is configured to turn off the charge switching element after charging the output capacitor; and
    the voltage monitor section is configured to check whether the short-circuit failure is present in the step-up switching element based on a rise of the coil output voltage or the boosted voltage after the charge switching element is turned off.

3. The voltage booster apparatus according to claim 2, wherein:
    the power supply relay control section is configured to turn on the power supply relay temporarily, when the step-up switching element is determined to have no short-circuit failure, so that the booster circuit performs voltage boosting operation;
    the voltage monitor section is configured to check whether the backflow prevention element has the short-circuit failure based on the rise of the boosted voltage produced by the voltage boosting operation of the booster circuit; and
    the power supply relay control section is further configured to maintain the power supply relay in an ON state for restoring the power steering operation, when the backflow prevention element is determined to have no short-circuit failure.

4. The voltage booster apparatus according to claim 2, wherein:
    the booster control section is configured to turn on the step-up switching element, when the step-up switching element is determined to have no short-circuit failure, so that the output capacitor is discharged through the step-up switching element;
    the voltage monitor section is configured to check whether the backflow prevention element has the short-circuit failure by comparing the coil output voltage with the boosted voltage produced after the output capacitor is discharged; and
    the power supply relay control section is configured to maintain the power supply relay in an ON state for restoring the power steering operation, when the backflow prevention element is determined to have no short-circuit failure.

5. The voltage booster apparatus according to claim 2, wherein:
    the booster control section is configured to turn on the step-up switching element, when the step-up switching element is determined to have no short-circuit failure, so that the output capacitor is discharged through the step-up switching element;

the voltage monitor section is configured to check whether the backflow prevention element has the short-circuit failure based on a speed of fall of the boosted voltage produced after the output capacitor is discharged; and the power supply relay control section is configured to maintain the power supply relay in an ON state for restoring the power steering operation, when the backflow prevention element is determined to have no short-circuit failure.

6. The voltage booster apparatus according to claim 3, wherein:

the voltage monitor section is configured to check whether the booster power supply terminal has a short-circuit failure by comparing the coil output voltage or the boosted voltage with the battery voltage, when the power supply relay is turned on temporarily.

7. The voltage booster apparatus according to claim 1, wherein:

the voltage monitor section is configured to confirm, before the charge switching element is turned on, that the coil output voltage and the boosted voltage change less than a predetermined amount in a predetermined time.

8. A voltage booster apparatus for a power steering system comprising:

a battery for supplying a battery voltage;

a booster circuit including a coil, a step-up switching element, an output capacitor and a current flow control element, the coil having an input end for receiving the battery voltage, the step-up switching element being connected in series with the coil at an output end of the coil, the output capacitor being connected in series with the coil in parallel relation with the step-up switching element, and the current flow control element being connected between the output end of the coil and one end of the capacitor for preventing a current flow from the capacitor to the coil;

a charge switching element connected to the output end of the coil for supplying a reference voltage to the output end of the coil when turned on;

a control unit configured to control a voltage boosting operation of the booster circuit by turning on and off the step-up switching element so that the coil produces a coil output voltage at the coil output end a boosted voltage is produced from the output capacitor;

the control unit being configured to interrupt supply of the battery voltage to the booster circuit upon detection of a short-circuit failure of the step-up switching element or the current flow control element;

the control unit being configured to turn on the charge switching element to supply the reference voltage to the output end of the coil for charging the output capacitor by the reference voltage in response to interruption of the battery voltage;

the control unit being configured to turn on the step-up switching element in a predetermined manner after the output capacitor is charged with the reference voltage;

the control unit being configured to check whether the step-up switching element and the current flow control element have the short-circuit failure based on the coil output voltage and the boosted voltage produced after the charge switching element is turned on to supply the reference voltage; and the control unit being configured to restore the supply of the battery voltage to the booster circuit after both of the step-up switching element and the current flow control element are determined to have no short-circuit failure.

9. The voltage booster apparatus according to claim 8, further comprising:

a power supply relay connected between the battery and the booster circuit to supply and interrupt the battery voltage when turned on and off, respectively, the power supply relay being turned off upon detection of the short-circuit failure by the control unit, wherein the control unit is configured to turn on temporarily the power supply relay after the reference voltage is supplied to the output end of the coil by the charge switching element is turned on, wherein the control unit is configured to turn on and off the step-up switching element for boosting the battery voltage, and wherein the control unit is configured to turn on and off the power supply relay when the boosted voltage rises or does not rise, respectively, as a result of turning on and off the step-up switching element after the reference voltage is supplied.

10. The voltage booster apparatus according to claim 8, further comprising:

a power supply relay connected between the battery and the booster circuit to supply and interrupt the battery voltage when turned on and off, respectively, the power supply relay being turned off upon detection of the short-circuit failure by the control unit, wherein the control unit is configured to turn on the step-up switching element after the reference voltage is supplied to the output end of the coil by the charge switching element is turned on, wherein the control unit is configured to compare the coil output voltage with the boosted voltage produced after the step-up switching element is turned on, and wherein the control unit is configured to turn on the power supply relay again only when a comparison result indicates that the boosted voltage is much higher than the coil output voltage.

11. The voltage booster apparatus according to claim 8, further comprising:

a power supply relay connected between the battery and the booster circuit to supply and interrupt the battery voltage when turned on and off, respectively, the power supply relay being turned off upon detection of the short-circuit failure by the control unit, wherein the control unit is configured to turn on the step-up switching element after the reference voltage is supplied to the output end of the coil by the charge switching element is turned on, wherein the control unit is configured to check whether a speed of rise of the boosted voltage is less than a predetermined speed, and wherein the control unit is configured to turn on the power supply relay again only when a check result indicates that the speed of rise of the boosted voltage is less than the predetermined speed.

* * * * *